US010246759B2

(12) United States Patent
Sugita et al.

(10) Patent No.: US 10,246,759 B2
(45) Date of Patent: Apr. 2, 2019

(54) METHOD OF RECOVERING RARE-EARTH ELEMENTS

(71) Applicants: NIPPON LIGHT METAL COMPANY, LTD., Tokyo (JP); THE JAMAICA BAUXITE INSTITUTE LIMITED, Kingston (JM)

(72) Inventors: Kaoru Sugita, Shizuoka (JP); Yasushi Kobayashi, Shizuoka (JP); Yoshihiro Taguchi, Shizuoka (JP); Wilmon Wallen-Bryan, Kingston (JM); Worrell Lyew You, Kingston (JM); Parris A Lyew-Ayee, Kingston (JM)

(73) Assignees: Nippon Light Metal Company, Ltd., Tokyo (JP); The Jamaica Bauxite Institute Limited, Kingston (JM)

( * ) Notice: Subject to any disclaimer, the term of this patent is extended or adjusted under 35 U.S.C. 154(b) by 693 days.

(21) Appl. No.: 14/636,722

(22) Filed: Mar. 3, 2015

(65) Prior Publication Data
US 2016/0251739 A1    Sep. 1, 2016

(30) Foreign Application Priority Data
Feb. 27, 2015 (JP) .................................. 2015-38799

(51) Int. Cl.
*C22B 59/00* (2006.01)
*C22B 7/00* (2006.01)
(Continued)

(52) U.S. Cl.
CPC .............. *C22B 3/44* (2013.01); *C22B 3/0068* (2013.01); *C22B 7/007* (2013.01); *C22B 59/00* (2013.01); *Y02P 10/234* (2015.11)

(58) Field of Classification Search
CPC ............ C22B 3/44; C22B 59/00; C22B 7/007
See application file for complete search history.

(56) References Cited

U.S. PATENT DOCUMENTS 2,859,092 A * 11/1958 Bailes ................ B01D 11/0488
                                                    423/10
5,030,424 A *  7/1991 Fulford ................... C01F 7/066
                                                    423/111
(Continued)

FOREIGN PATENT DOCUMENTS

WO   WO-2012126092 A1 *  9/2012 ............... C22B 3/06
WO   WO 2013/085052 A1    6/2013
(Continued)

*Primary Examiner* — Melissa S Swain
(74) *Attorney, Agent, or Firm* — Birch, Stewart, Kolsach & Birch, LLP (57) ABSTRACT

Provided is a method of recovering rare-earth elements by performing slight pH adjustment of a leachate, which does not require such significant pH adjustment as in conventional methods, reduces cost and effort, and can efficiently recover rare-earth elements in a bauxite residue in a good yield. The method of recovering rare-earth elements is a method of recovering rare-earth elements, the method including: a leaching step of bringing a raw material bauxite residue, which is produced as a by-product in a Bayer process, into contact with a liquid leaching agent to recover a leachate containing rare-earth elements; an extraction step of bringing the leachate into contact with an extraction treatment liquid containing a phosphoric acid ester-based extractant to recover an extract liquid containing the rare-earth elements; and a back extraction step of bringing the extract liquid into contact with a back extraction treatment liquid to recover the rare-earth elements, the leaching step including recovering a leachate having a pH of 0.5 or more and 1.2 or less by using an acidic liquid leaching agent, the extraction step including adjusting the pH of the leachate to 1.0 or more and 1.7 or less and then bringing the leachate into contact with the extraction treatment liquid.

7 Claims, 1 Drawing Sheet

(51) Int. Cl.
*C22B 3/44* (2006.01)
*C22B 3/38* (2006.01)

(56) References Cited

U.S. PATENT DOCUMENTS

2014/0283652 A1   9/2014  Sugita et al.
2015/0086449 A1*  3/2015  Sugita ..................... B09B 3/00
                                                         423/21.1

FOREIGN PATENT DOCUMENTS

WO   WO 2013/145455 A1   10/2013
WO   WO 2014020626 A1 *   2/2014  ............. C22B 7/009

* cited by examiner

METHOD OF RECOVERING RARE-EARTH ELEMENTS

BACKGROUND OF THE INVENTION

1. Field of the Invention

The present invention relates to a method of recovering useful rare-earth elements such as Sc, Y, and lanthanoids, by using, as a raw material, a solid residue produced as a by-product in a Bayer process for producing alumina from bauxite (the solid residue is hereinafter referred to as "bauxite residue", and in the case of containing $Fe_2O_3$ as a main component, is generally called "red mud" because of having a red color), and more particularly, to a method involving causing the rare-earth elements to leach from the bauxite residue and efficiently recovering the rare-earth elements from the resultant leachate.

2. Description of the Related Art

Rare-earth elements are widely used in applications such as a high strength Al alloy, a phosphor, a magnetic substance, optical glass, and a catalyst. In particular, the use of the rare-earth elements as materials for producing a permanent magnet has been rapidly expanding.

The rare-earth elements are also contained in bauxite, which is an ore resource of aluminum. It is known that the rare-earth elements are caused to dissolve from bauxite and are then separated and recovered. It is also known that a bauxite residue produced as a by-product in a Bayer process in producing aluminum oxide from bauxite by a Bayer method is used as a raw material, the rare-earth elements are caused to leach from the bauxite residue with sulfurous acid, and the rare-earth elements are separated and recovered from the resultant leachate (U.S. Pat. No. 5,030,424).

However, when U.S. Pat. No. 5,030,424, which relates to a method of recovering rare-earth elements from a bauxite residue, is considered, in the leaching step of causing rare-earth elements to leach from a bauxite residue into a liquid leaching agent to obtain a leachate, it is required to repeat a leaching operation two or three times, the use amount of the liquid leaching agent necessary for the operation increases, the number of times of a solid-liquid separation operation increases, and hence there is a problem in that high cost is required for recovering rare-earth elements from a bauxite residue.

In view of the foregoing, the inventors of the present invention previously proposed, as a method of solving the problem of U.S. Pat. No. 5,030,424, a method of recovering rare-earth elements from a bauxite residue, the method involving preparing a slurry having a liquid-solid ratio of from 2 to 30 and a pH of from 0.5 to 2.2 by using a bauxite residue having a specific surface area of 35 $m^2/g$ or more and by using, as a liquid leaching agent, an aqueous solution of at least one kind of mineral acid selected from sulfuric acid, hydrochloric acid, nitric acid, and sulfurous acid, subjecting the slurry to leaching treatment of rare-earth elements under a temperature condition of from room temperature to 160° C., subjecting the slurry after the leaching treatment to solid-liquid separation, and separating and recovering the rare-earth elements from the resultant leachate (International Patent WO2013/145455A).

Further, the inventors of the present invention proposed, as a method involving causing Nd and Dy, which are particularly highly beneficial as materials for, for example, a Nd—Fe—B-based permanent magnet, to leach from a bauxite residue or the like efficiently, and recovering the Nd and Dy, a method of recovering rare-earth elements, the method involving, in a leaching step, using, as a raw material, a bauxite residue containing Ca at a ratio of from 4 to 15 mass % in terms of CaO and Ti at a ratio of from 2 to 13 mass % in terms of $TiO_2$ in a solid component (S) obtained by drying under a drying condition of 110° C. and 2 hours, using, as a liquid leaching agent, an acid aqueous solution containing hydrochloric acid and/or nitric acid and having a pH of from 0 to 2.7, and causing rare-earth elements to leach together with Ca under a heating and pressurizing condition of a temperature of from 160 to 300° C. and a pressure of from 0.65 to 10 MPa (International Patent WO2013/085052A).

Incidentally, the bauxite residue generally contains particularly large amounts of $Fe_2O_3$ and $Al_2O_3$, and even after the bauxite residue is subjected to leaching treatment by using, for example, an aqueous solution of a mineral acid, the Fe fraction and Al fraction are caused to leach as impurities in the resultant leachate. It is known that such impurities as the Fe fraction and Al fraction in the leachate form a phase of an emulsion or a suspension (hereinafter sometimes referred to as "emulsion"), for example, between an organic phase and an aqueous phase (the formed phase is hereinafter sometimes referred to as "third phase") in a subsequent recovery step of rare-earth elements (crude recovered product) from the leachate by a solvent extraction method. When the third phase is generated, the third phase can be removed by such a method as filtration, but parts of rare-earth elements may be contained in the third phase, and hence it has been concerned that the recovery ratio of rare-earth elements may lower. It has also been concerned that, when a large amount of the leachate is treated as in an actual operation, there is a problem in that separation treatment itself of the third phase requires much cost and effort.

Thus, in each of the above-mentioned methods of recovering rare-earth elements disclosed in International Patent WO2013/145455A and International Patent WO2013/085052A, for the purpose of preventing the generation of the third phase, a pH adjuster was used to adjust the pH of the leachate to from 2.5 to 3.5 preliminarily, an Fe fraction, an Al fraction, and the like were caused to precipitate, followed by removal of the resultant precipitate, and a solvent extraction method was applied to the leachate without further treatment or the pH of the leachate was re-adjusted to from 1.2 to 2.5 and then treatment of the resultant leachate was performed by a solvent extraction method. In general, however, the resultant leachate has a pH of 1.2 or less, and it is necessary to use an extremely large amount of the pH adjuster to adjust the pH to from 2.5 to 3.5, causing cost increase. When cost calculation is performed in consideration of an actual operation level, for example, the equivalent amount of an alkali to one third of the amount of an acid necessary to adjust the pH of a raw material slurry to 1.0 is first used in a leaching step in order to increase the pH of a leachate from 1.0 to 3.0, and an acid in the half amount of the amount of the alkali is then further used to adjust the pH of the leachate from 3.0 to 1.75. Herein, when the prices of the acid and alkali are assumed to be the same, the liquid-solid ratio (L/S) thereof is set to 6, the acid is used in the amount of about 25 $kg/m^3$ in terms of concentrated sulfuric acid, and the cost of concentrated sulfuric acid is assumed to be 10 yen/kg, a chemical cost of 250 $yen/m^3$ is needed. As a result, the chemical cost of the above-mentioned treatment increases by 1.5 times rather than otherwise. In addition, a solid-liquid separation step of filtering fine precipitates needs to be separately performed, thus further increasing the cost of each of the methods of recovering rare-earth elements.

Thus, using such conventional pH adjusting methods requires much cost and effort. Further, examination by the inventors of the present invention has found that rare-earth elements are mixed in the precipitate deposited by the pH adjustment at as many a ratio as about 10% of the amount of all the rare-earth elements caused to leach in a leachate. Moreover, the mixed rare-earth elements contain a causative substance causing the third phase to be generated, and hence a leaching step needs to be separately prepared to recover the rare-earth elements, necessitating an extremely high cost. If the rare-earth elements in the precipitate are not recovered, there has been a problem in that the recovery ratio of rare-earth elements remarkably reduces.

On the other hand, among the impurities contained in the leachate, such as an Fe fraction and an Al fraction, the amount of the Al fraction is, in particular, remarkably larger than the total amount of rare-earth elements caused to leach in the leachate. It is known that the Al fraction shows the same behavior as light rare-earth elements in a solvent extraction method (extraction step) using a phosphoric acid ester-based extractant, and hence, when such a method as being able to separate an Al fraction from rare-earth elements like the pH adjustment described above is not performed, there has been a problem in that it is extremely difficult to remove an Al fraction in a recovery step (extraction step, back extraction step, or the like) of rare-earth elements (crude recovered product) from a leachate by a solvent extraction method. Thus, it has been desired to develop a method of recovering rare-earth elements free of an Al fraction without performing, for example, the pH adjustment described above.

In addition, the impurities caused to leach in the leachate include high solvent-extractable metal impurities such as Fe, Ti, Th, Zr, and U, low solvent-extractable metal impurities such as Ca, Mn, Si, and Na, and organic substances. In this connection, the high solvent-extractable metal impurities have a poor back extraction characteristic. Thus, although back extraction thereof is possible to a certain extent in the subsequent back extraction step, when continuous treatment is performed, parts of the high solvent-extractable metal impurities are not back-extracted in a back extractant but remain in the leachate, and are gradually accumulated in an extractant (extraction treatment liquid containing a phosphoric acid ester-based extractant or the like) used in the solvent extraction step, and it has been confirmed that there is a problem in that, when the accumulation concentration thereof exceeds the accumulation limit concentration thereof, the extraction efficiency of rare-earth elements in the extraction treatment liquid is inhibited. On the other hand, the low solvent-extractable metal impurities are not easily extracted by the solvent extraction method (extraction step), thus not particularly causing any problem. However, when sulfuric acid is used in a leaching step, plaster precipitates in the sulfuric acid, and it has been confirmed that there is a problem in that, when the metal impurities are contained at a high concentration, the metal impurities and rare-earth elements coprecipitate, causing recovery loss of rare-earth elements. In addition, it has been confirmed that, when such a conventional method as significant pH adjustment by which the pH of a leachate is adjusted to about 3 is not performed, a third phase is generated in, for example, a recovery step of rare-earth elements (crude recovered product) from the leachate by a solvent extraction method. Further, it has also been confirmed that humic organic impurities caused to leach in the leachate cause scum to occur in a settler, thereby causing an obstacle to happen in the recovery step, and rare-earth elements are contained in the humic organic impurities. It has also been confirmed that there is a problem in that the precipitates, the third phase, the scum, and the like cause the reduction of the recovery ratio of rare-earth elements.

SUMMARY OF THE INVENTION

In view of the foregoing, the inventors of the present invention have earnestly made studies to solve the above-mentioned problems. Surprisingly, the inventors have found that, when the pH of a leachate used in a recovery treatment of rare-earth elements by a solvent extraction method is adjusted to a value within a predetermined range lower than the values of the conventional pH adjustments before the recovery treatment is performed, it is not necessary to perform such a treatment as significantly adjusting the pH thereof to yield a precipitate, and removing the precipitate preliminarily, as in conventional methods, and hence the cost and effort necessary for the pH adjustment can be significantly reduced, the extraction ratio of an Al fraction can be kept low, the Al fraction being caused to leach in the leachate in a large amount and having been considered to be difficult to separate from light rare-earth elements, and rare-earth elements as intended substances can be efficiently recovered. Further, the inventors have found that, in addition to the treatment of the Al fraction, the extraction ratio of an Fe fraction, which is an impurity caused to leach in a relatively large amount, is suppressed by adjusting the oxidation-reduction potential in the leachate or predetermined pretreatment is performed prior to the recovery step of rare-earth elements, thereby preliminarily separating and removing impurities, for example, high solvent-extractable metals such as Ti and organic substances, and, consequently, rare-earth elements can be recovered efficiently without inhibiting the extraction efficiency in the extraction step particularly when continuous treatment is performed. As a result, the present invention has been completed.

That is, according to one embodiment of the present invention, there is provided a method of recovering rare-earth elements from a bauxite residue, which is produced as a by-product in a Bayer process and is used as a raw material, the method including: a leaching step of bringing the bauxite residue into contact with a liquid leaching agent to recover a leachate containing rare-earth elements; an extraction step of bringing the leachate into contact with an extraction treatment liquid containing a phosphoric acid ester-based extractant to recover an extract liquid containing the rare-earth elements; and a back extraction step of bringing the extract liquid into contact with a back extraction treatment liquid to recover the rare-earth elements, the leaching step including recovering a leachate having a pH of 0.5 or more and 1.2 or less by using an acidic liquid leaching agent, the extraction step including adjusting the pH of the leachate to 1.0 or more and 1.7 or less and then bringing the leachate into contact with the extraction treatment liquid.

It is preferred that the method of recovering rare-earth elements according to the one embodiment of the present invention further include, between the leaching step and the extraction step, a pretreatment step of bringing the leachate recovered in the leaching step into contact with a pretreatment liquid containing one of a phosphoric acid ester-based extractant and a phosphonic acid ester-based extractant at a concentration of from 0.01 to 0.1 mol/L, followed by filtration treatment, to thereby recover a pretreated leachate containing the rare-earth elements.

Further, in the method of recovering rare-earth elements according to the one embodiment of the present invention, it is preferred that the extraction step include bringing the leachate into contact with the extraction treatment liquid under a condition that one of the leachate and the pretreated leachate has an oxidation-reduction potential of 300 mV or less.

Further, in the method of recovering rare-earth elements according to the one embodiment of the present invention, it is preferred that the extraction treatment liquid brought into contact with one of the leachate and the pretreated leachate in the extraction step contain the phosphoric acid ester-based extractant at a concentration of from 0.2 to 1.5 mol/L.

Further, in the method of recovering rare-earth elements according to the one embodiment of the present invention, it is preferred that the back extraction step includes: dispersing a back extraction treatment liquid phase by bringing the extract liquid and the back extraction treatment liquid into contact with each other, to thereby form a phase separation structure with a sea-island structure having an extract liquid phase and the back extraction treatment liquid phase, the dispersing being performed so that the back extraction treatment liquid phase has an average droplet diameter of from 0.2 to 1.0 mm; and recovering the rare-earth elements as solid salts.

Further, in the method of recovering rare-earth elements according to the one embodiment of the present invention, it is preferred that the back extraction treatment liquid include a 40 to 60 mass % sulfuric acid aqueous solution, and the extract liquid and the sulfuric acid aqueous solution be brought into contact with each other at a volume ratio "extract liquid:sulfuric acid aqueous solution" of from 5:1 to 10:1.

Further, in the method of recovering rare-earth elements according to the one embodiment of the present invention, it is preferred that the back extraction treatment liquid include a 4 N to 8 N hydrochloric acid aqueous solution, and the extract liquid and the hydrochloric acid aqueous solution be brought into contact with each other at a volume ratio "extract liquid:hydrochloric acid aqueous solution" of from 5:1 to 10:1.

In addition, in the method of recovering rare-earth elements according to the one embodiment of the present invention, it is preferred that the back extraction step include: subjecting the used extract liquid to back extraction using an acid aqueous solution as a back extractant to reduce an accumulated Al fraction; and using the resultant used extract liquid as a recycled extraction treatment liquid.

In the method of recovering rare-earth elements according to the one embodiment of the present invention, it is not necessary to perform significant pH adjustment unlike according to conventional methods, thus being able to reduce cost and effort, slight pH adjustment of a leachate contributes to facilitating the separation of impurities caused to leach in the leachate, thus being able to recover rare-earth elements in a bauxite residue efficiently, and hence resources in the bauxite residue can be effectively utilized. The present invention has a large significance particularly in a method of recovering rare-earth elements in which rare-earth elements are recovered by using a solvent extraction method in continuous treatment.

DETAILED DESCRIPTION OF THE PREFERRED EMBODIMENTS

Now, embodiments of the present invention are specifically described.

In a method of the present invention, the term "rare-earth elements" is used to refer collectively to Sc with an atomic number of 21, Y with an atomic number of 39, and La to Lu with atomic numbers of from 57 to 71 (hereinafter referred to as "lanthanoids"), but this does not deny the possibility that Ac to Lr with atomic numbers of from 89 to 103 are caused to leach and are separated and recovered by the method of the present invention. Note that in the invention of the present application, the term "light rare-earth elements" refers to La, Ce, Pr, Nd, and Sm, the term "medium rare-earth elements" refers to Eu, Gd, and Tb, and the term "heavy rare-earth elements" refers to Dy, Ho, Y, Er, Tm, Yb, and Lu.

First, any raw material bauxite residue can be used in the present invention without particular limitations, but a raw material bauxite residue having a specific surface area of 35 $m^2/g$ or more is preferably used. This is because rare-earth elements are likely to be concentrated at a relatively high concentration in a bauxite residue having such specific surface area, and hence the rare-earth elements can be caused to leach efficiently. Such bauxite residue having a high specific surface area can be obtained, as is known, by applying fractionation treatment to, for example, a bauxite residue that is produced in a Bayer process performed under the condition of a treatment temperature of 160° C. or less by using bauxite having a specific surface area of 26 $m^2/g$ or more as a raw material, or a bauxite residue that is produced in a Bayer process performed under the condition of a treatment temperature of less than 230° C. by using bauxite having a specific surface area of 26 $m^2/g$ or more as a raw material and that contains CaO at less than 4 mass %. Further, as a method for selectively obtaining a raw material bauxite residue formed of a high specific surface area fraction mainly including fine particles and having a specific surface area of 35 $m^2/g$ or more by fractionation treatment from a bauxite residue in which fine particles having a relatively high specific surface area and coarse particles having a relatively low specific surface area are mixed and which has a specific surface area of less than 35 $m^2/g$, there may be given, for example, a method in which classification is performed by using a sieve having a mesh size of from 38 to 400 μm, preferably a sieve having a mesh size of from 38 to 300 μm. The fractionation treatment performed by using a sieve having a mesh size of from 38 to 400 μm may be wet treatment or dry treatment.

Further, in the present invention, the content of rare-earth elements in the raw material bauxite residue is not particularly limited, but it is preferred, from the viewpoint of improving leaching efficiency in leaching treatment, that rare-earth elements be contained at 1,500 ppm or more in total in a solid component prepared by drying the raw material bauxite residue under a drying condition of preferably 110° C. and 2 hours. This is because, when the total content of rare-earth elements is less than 1,500 ppm, the low absolute amount may cause the reduction of the profitability.

In the present invention, a slurry is prepared by bringing an acidic liquid leaching agent into contact with a raw material bauxite residue, and the slurry is subjected to leaching treatment to recover a leachate containing rare-earth elements (leaching step). The liquid leaching agent used in the leaching step is not limited as long as it is an acidic solution, and one kind of mineral acid selected from sulfuric acid, hydrochloric acid, nitric acid, and the like may be suitably used alone or two or more kinds thereof may be suitably used as a mixture. The pH of the leachate recovered in the leaching step is recommended to be set to from 0.5 to 1.2, preferably from 0.9 to 1.1. When the pH of the leachate is more than 1.2, the leaching ratio of rare-earth elements reduces. In contrast, when the pH of the leachate is less than 0.5, the use amount of an acid remarkably increases, the leaching ratio of rare-earth elements except Sc reduces, and the leaching ratio of impurity elements such as Al, Fe, and Ti increases, resulting in an increase in cost necessary for removing the impurities. When the slurry is prepared, water is added to a raw material bauxite residue, followed by mixing, to prepare a slurry state having a predetermined concentration, the slurry, mineral acid, and the like are simultaneously added into a reaction tank at a certain ratio while being dispersed, the whole is stirred and mixed for a predetermined time to induce reaction, the pH of the slurry is measured, the pH is compared to a target value, and the mixing ratio of the slurry and mineral acid is adjusted to achieve a predetermined pH value. Alternatively, the slurry may be prepared as follows. A predetermined amount of water is added to a raw material bauxite residue to prepare a slurry, a predetermined amount of a mineral acid or the like is added gradually, the whole is mixed, and water is added, followed by mixing. The slurry is preferably prepared as follows. A predetermined amount of water is added to a weighed raw material bauxite residue to prepare a slurry, the liquid-solid ratio of the slurry is measured, the slurry and mineral acid at a predetermined concentration are simultaneously added into a reaction tank at a flow rate of the mineral acid in proportion to a flow rate of the slurry, the whole is stirred and mixed for a predetermined time, the pH of the slurry is measured, the ratio of the flow rate of the mineral acid to the flow rate of the slurry is adjusted, thereby being able to prepare a slurry having a predetermined pH value, and hence the liquid-solid ratio (L/S) and pH value of the prepared slurry can be easily adjusted to desired values.

Further, the ratio of a liquid component (L) to a solid component (S) in the prepared slurry, that is, the liquid-solid ratio (L/S), is 2 or more and 30 or less, preferably 4 or more and 10 or less. When the liquid-solid ratio (L/S) of the slurry is less than 2, the viscosity of the slurry becomes higher and the slurry is difficult to handle in the subsequent solid-liquid separation treatment, with the result that the recovery ratio of the resultant leachate lowers. In contrast, even if the liquid-solid ratio (L/S) of the slurry is more than 30, not only the leaching ratio of rare-earth elements is saturated and does not improve, but also the amount of water used increases and the amount of the resultant leachate increases. As a result, a larger apparatus needs to be used at the time of performing solid-liquid separation for obtaining a leachate after leaching treatment and performing separation and recovery for recovering rare-earth elements from the leachate. In addition, another disadvantage is an increased cost because a larger apparatus needs to be used, larger amounts of chemicals need to be used, and more wastes need to be disposed of.

The treatment temperature at which the leaching treatment is performed falls within the range of from room temperature (20° C.) or more to 160° C. or less, preferably from 25° C. or more to 105° C. or less. As the treatment temperature is higher, the leaching ratios of rare-earth elements tend to be higher. However, the leaching ratios of Al and Fe, which are impurities, also increase. Thus, the treatment temperature is desirably selected and determined in consideration of a balance among energy cost, the kinds and leaching ratios of rare-earth elements to be recovered, and the like.

Further, the holding time for which the slurry is held at the temperature described above in the leaching treatment is 1 second or more and 180 hours or less. The holding time is preferably 30 minutes or more and 180 hours or less for the leaching of Sc, and is preferably 1 second or more and 7 minutes or less for the leaching of lanthanoids. It is preferred to agitate the slurry during the leaching treatment because leaching ratios with smaller variations are obtained. When the holding time is less than 1 second, the problem of leaching ratios with larger variations occurs. Further, when lanthanoids are caused to leach, it is also suitable that the slurry be held for 1 second or more and 7 minutes or less and immediately after that, the slurry be diluted and cooled with water having a temperature of 50° C. or less in an amount equal to or larger than the amount of the slurry. With this, it is possible to control easily the holding time for which the slurry is held at the leaching temperature described above in the leaching treatment. Alternatively, it is possible to cause lanthanoids to leach during a holding time of 1 second or more and 7 minutes or less to recover the lanthanoids, and then cause Sc to leach during a holding time of 30 minutes or more and 180 hours or less, thereby causing both Sc and lanthanoids to leach efficiently and recovering them.

The slurry after the leaching treatment is directly subjected to solid-liquid separation by means such as filtration, centrifugal separation, precipitation separation, or decantation, or is subjected to the solid-liquid separation after the pH has been adjusted to from 0.5 to 1.2 as described above. Thus, a leachate including rare-earth elements is recovered. It is preferred that the solid residue yielded by the solid-liquid separation be washed with washing water so that the leachate attached to the solid residue is washed out, and the leachate be transferred into water and recovered. Both the recovered leachate and the leachate previously yielded by the solid-liquid separation may be used as a leachate for the subsequent separation and recovery of rare-earth elements. When the amount of the washing water to be used for washing the solid residue is too small, the leachate attached to the solid residue cannot be recovered sufficiently. In contrast, when the amount of the washing water to be used is too large, a larger burden is applied to the subsequent separation and recovery treatment of rare-earth elements. Thus, the ratio of the washing water (L) to the solid residue (S), that is, the liquid-solid ratio (L/S), desirably falls within the range of from 2 to 30 in ordinary cases.

The leachate yielded by the above-mentioned solid-liquid separation treatment (leaching step) is, after the pH has been adjusted to from 1.0 to 1.7 as described later, transferred to the separation and recovery of rare-earth elements for separating and recovering rare-earth elements including Sc, Y, and lanthanoids. The separation and recovery treatment of rare-earth elements from the leachate can be carried out by a known method, and examples of the method include a hydroxide precipitation method, an oxalate precipitation method, a carbonate method, a solvent extraction method, and an ion exchange method. In the present invention, the solvent extraction method is used, for example, because problems hardly occur in its steps, the treatments can be continuously performed, and the cost is low. The reasons why other methods than the solvent extraction method are not used positively are the occurrence of, for example, the following problems. 1) When the oxalate precipitation method is used, Al caused to leach in a large amount in a leachate reacts with oxalic acid earlier than rare-earth elements, and hence the use amount of oxalic acid is huge. 2) When the carbonate method is used, Al and Fe are liable to be removed poorly. 3) When the hydroxide precipitation method is used, the use amount of an alkali is huge. 4) When the ion-exchange resin method is used, clogging of an ion-exchange resin is liable to occur. Specifically, an extraction treatment liquid containing a phosphoric acid ester-based extractant is brought into contact with the leachate containing rare-earth elements recovered in the leaching step or with a leachate after pretreatment (hereinafter referred to as "pretreated leachate") which is obtained by applying pretreatment to be described later to the leachate, to recover an extract liquid in which rare-earth elements (crude recovered product) is extracted into the extraction treatment liquid (extraction step). Specifically, the leachate or the pretreated leachate and the extraction treatment liquid are mixed and stirred by using, for example, a mixer with a stirring blade, thereby extracting rare-earth elements into the extraction treatment liquid.

In the present invention, the pH of the leachate or pretreated leachate to be brought into contact with the extraction treatment liquid in the extraction step needs to be set to 1.0 or more and 1.7 or less and is recommended to be preferably 1.2 or more and 1.6 or less. When a leachate or pretreated leachate having a pH of more than 1.7 is used in an extraction step, the extraction rate of Al extracted into an extraction treatment liquid remarkably increases, with the result that a large amount of an Al fraction is contained in an extract liquid recovered in the extraction step. Thus, as described above, there occurs a problem in that an increased burden is applied to the subsequent purification step or a problem in that increased impurities are contained in purified products (rare-earth elements). Note that the extraction rate of rare-earth elements extracted into an extraction treatment liquid does not change significantly when the pH of a leachate or pretreated leachate is about 1.7. In contrast, when the pH of a leachate or pretreated leachate is less than 1.0, the extraction ratios themselves of light rare-earth elements and medium rare-earth elements particularly decrease, and hence the recovery ratios of light rare-earth elements and medium rare-earth elements decrease. As described above, it is possible to use a known method to adjust the pH of a leachate or pretreated leachate, and a pH adjuster containing an alkali or an acid can be used. It is also possible to use, as such pH adjuster, a bauxite residue produced as a by-product in a Bayer process, and hence the use amount of a chemical such as an alkali or an acid can be saved. Moreover, rare-earth elements contained in the bauxite residue added as a pH adjuster are caused to leach into a leachate, and hence rare-earth elements can be efficiently recovered.

Herein, examples of the phosphoric acid ester-based extractant contained in the extraction treatment liquid include bis(2-ethylhexyl) hydrogen phosphate (D2EHPA) and tributyl phosphate (TBP). In particular, it is preferred to use D2EHPA because D2EHPA has an excellent ability to separate rare-earth elements and aluminum in addition to having an extraction ability and back extraction ability of rare-earth elements from a leachate having a low pH. The concentration of the phosphoric acid ester-based extractant in the extraction treatment liquid is preferably from 0.2 to 1.5 mol/L and is more preferably from 0.8 to 1.2 mol/L for the reason of being able to increase the extraction ratio of light rare-earth elements to a relatively high level while suppressing the extraction ratio of an Al fraction. In order to adjust the concentration, the phosphoric acid ester-based extractant can be used after being diluted with a non-polar organic solvent. Examples of the non-polar organic solvent may include: one kind or two or more kinds of aliphatic hydrocarbons selected from hexane, decane, dodecane, and tetradecane; one kind or two or more kinds of aromatic hydrocarbons selected from benzene, toluene, and xylene; one kind or two kinds of alcohols selected from octanol and decanol; and a petroleum fraction typified by kerosene. It is also possible, if necessary, to use these organic solvents as a mixture. Further, it is also possible to carryout extraction by a solvent extraction method at two or more stages. It is preferred to carry out the extraction at two or more stages, because rare-earth elements as crude recovered products can be separated into each kind of rare-earth element.

The contact time for which the leachate or pretreated leachate and the extraction treatment liquid are brought into contact with each other in the extraction step is preferably 5 minutes or less, more preferably 3 minutes or less. When the contact time is more than 5 minutes, the amount of Al extracted in the extraction treatment liquid increases, and as described above, there occurs a problem in that an increased burden is applied to the subsequent purification step or a problem in that increased impurities are contained in purified products (rare-earth elements). In addition, additional cost and effort are needed to perform separation treatment of Al in the subsequent step, resulting in being disadvantageous in cost. Note that the leachate or pretreated leachate and the extraction treatment liquid are brought into contact with each other at a liquid ratio "leachate or pretreated leachate:extraction treatment liquid" of preferably from 1:1 to 10:1, more preferably from 3:1 to 10:1.

Further, in the extraction step, the oxidation-reduction potential (with reference to silver/silver chloride electrode potential) of the leachate or pretreated leachate to be brought into contact with the extraction treatment liquid is preferably 300 mV or less, more preferably 100 mV or less. For the following reason, it is preferred that the oxidation-reduction potential be 300 mV or less. In the case of such oxidation-reduction potential, in a leachate or pretreated leachate having a pH of from 1.0 to 1.7, almost all Fe ions contained therein can be converted from the state of trivalent ions ($Fe^{3+}$), which are likely to be extracted into an extraction treatment liquid in the subsequent extraction step, to the state of divalent ions ($Fe^{2+}$), which are unlikely to be extracted. As a result, it is possible to decrease the amount of Fe, which is extracted into an extract liquid and is accumulated in the extract liquid as an impurity that cannot be back-extracted. Thus, impurities such as Fe and Ti accumulated in the extract liquid recovered in the extraction step are back-extracted with an alkali, thereby being able to decrease significantly the frequency of producing a recycled extraction treatment liquid. As a method of adjusting the oxidation-reduction potential of a leachate or pretreated leachate, there may be given a method involving performing electrolytic reduction treatment and a method involving adding a reducing agent. The electrolytic reduction treatment is specifically performed with direct current by using an electrolytic tank in which an anode from which metal ions do not dissolve is used, a cathode having a large hydrogen overvoltage is used, the area of the cathode is set to a larger one than that of the anode, a cathode electrode is oscillated or rotated, thereby increasing the chance of contact between a leachate and the cathode, the limiting current density of the cathode is increased, and the electrode area of the cathode is designed so as to have a value equivalent to about five times or less of the limiting current density. The limiting current density significantly changes depending on the concentration of $Fe^{3+}$, and hence a larger effect is provided when a plurality of electrolytic tanks are placed and optimal designing is performed. Further, examples of the reducing agent include sodium thiosulfate, sodium sulfite, metal zinc, and metal iron. It is recommended that any of them be used by appropriately adjusting, for example, the use condition and addition amount thereof after the oxidation-reduction potential of a leachate or pretreated leachate has been measured. It is preferred that a leachate or pretreated leachate be less affected by air oxidation by reducing the chance of being exposed to air after reduction treatment. Such oxidation-reduction potential of a leachate or pretreated leachate only needs to fall within the above-mentioned range immediately before the extraction step is performed. That is, even when another treatment is included between the leaching step and the extraction step, the oxidation-reduction potential only needs to be appropriately adjusted so as to satisfy the above-mentioned range immediately before the leachate or pretreated leachate is brought into contact with an extraction treatment liquid.

Further, in the present invention, it is preferred that, prior to the extraction step of separating and recovering rare-earth elements from the leachate recovered in the leaching step, for example, the recovered leachate be subjected to pretreatment to remove impurities preliminarily (pretreatment step). It is particularly preferred to perform pretreatment by which impurities such as a metal that is back-extracted poorly in the extraction step, for example, Sc and Ti contained in the leachate, Th and U, which are radioactive substances, and organic substances derived from bauxite are preliminarily extracted into a pretreatment liquid containing a phosphoric acid ester-based extractant or a phosphonic acid ester-based extractant, followed by removal thereof, by bringing the leachate into contact with the pretreatment liquid. By performing such pretreatment, it is possible to reduce the concentration of the impurities contained in the leachate, and as a result, rare-earth elements can be efficiently separated and recovered in the subsequent steps. Examples of the phosphoric acid ester-based extractant contained in the pretreatment liquid include D2EHPA and TBP, and it is preferred to use, as the phosphonic acid ester-based extractant, mono-2-ethylhexyl 2-ethylhexyl phosphonate (PC88A). Further, the concentration of the phosphoric acid ester-based extractant or the phosphonic acid ester-based extractant contained in the pretreatment liquid is preferably from 0.01 to 0.1 mol/L, more preferably from 0.02 to 0.08 mol/L, from the viewpoint of exhibiting the characteristic that Ti, Th, U, and Sc are extracted, but Y and lanthanoids are not extracted. As a method of adjusting the concentration of the pretreatment liquid, there is given, for example, such a method using a non-polar organic solvent as described above. Note that the leachate and the pretreatment liquid are are brought into contact with each other at a liquid ratio of preferably from 5:1 to 1:1, more preferably from 2:1 to 3:1. The extractant concentration obtained by multiplying the concentration of the extractant and the liquid ratio is preferably from 0.02 to 0.03 mol/L (leachate ratio). Further, the contact time is preferably from 2 to 10 minutes. In this occasion, Sc is extracted into the pretreatment liquid by performing this pretreatment, but, when the pretreatment liquid is subjected to back extraction treatment by using an alkaline aqueous solution having a pH of 7.5 or more, Sc can be recovered as a solid hydroxide from the pretreatment liquid. 6 N HCl, 1 mol/L $Na_2CO_3$, or 6 to 12 N NaOH is used as a back extraction treatment liquid, and 10 to 12 N NaOH is preferably used, because, even if back extraction with the 10 to 12 N NaOH is performed many times, the ability of the pretreatment liquid is not changed. Moreover, in the mixture of the leachate and the pretreatment liquid to which the back extraction treatment has been applied, the pH of the leachate can be performed by using a predetermined amount of an acid or an alkali. Note that by using an extraction stirred liquid in the pretreatment step or by filtering a separated leachate in a settler, the generation of a third phase is prevented in the extraction step.

Then, in the present invention, when rare-earth elements are recovered from the extract liquid recovered in the extraction step, the rare-earth elements are recovered by performing back extraction treatment by bringing a back extraction treatment liquid into contact with the extract liquid (back extraction step). Hydrochloric acid or sulfuric acid is preferably used as the back extraction treatment liquid. It is preferred to use a 4 N to 8 N hydrochloric acid aqueous solution or a 40 to 60 mass % sulfuric acid aqueous solution in order to recover all rare-earth elements by back extraction. It is also possible to perform, prior to the back extraction step, back extraction of a Ca fraction by using a 0.2 N hydrochloric acid aqueous solution. The back extraction of a Ca fraction enables removal of a failure caused by precipitation of plaster, such as clogging of pipes in the back extraction step.

When the 4 N to 8 N hydrochloric acid aqueous solution is used as the back extraction treatment liquid, the extract liquid and the hydrochloric acid aqueous solution are brought into contact with each other at a volume ratio (ratio of flow rates per unit time in the case of continuous treatment) "extract liquid:hydrochloric acid aqueous solution" of preferably from 5:1 to 10:1. When the extract liquid and the hydrochloric acid aqueous solution are brought into contact with each other at a volume ratio (ratio of flow rates per unit time) within the above-mentioned range, the concentration of a back extract liquid can be increased without decreasing chances of the contact, and hence the above-mentioned range is preferred. Further, the contact time is preferably 5 minutes or less, more preferably from 1 to 3 minutes. Back extraction treatment for a short back extraction time enables the reduction of the back extraction amount of Al, and back extraction treatment for 1 minute or more enables achievement of a satisfactory back extraction ratio of rare-earth elements. Thus, the separation ratio of Al and rare-earth elements can be increased. It is preferred to perform such back extraction treatment using a hydrochloric acid aqueous solution, because rare-earth elements can be recovered as a hydrochloric acid aqueous solution, and high concentration can be achieved by increasing the liquid ratio, thus being able to use the resultant solution as a raw material liquid to be directly used in the subsequent purification step.

On the other hand, when a sulfuric acid aqueous solution having a concentration of 40 to 60 mass % is used as the back extraction treatment liquid, the extract liquid and the sulfuric acid aqueous solution are brought into contact with each other at a volume ratio (ratio of flow rates per unit time in the case of continuous treatment) "extract liquid:sulfuric acid aqueous solution" of preferably from 5:1 to 10:1. When the extract liquid and the sulfuric acid aqueous solution are brought into contact with each other at a volume ratio within the above-mentioned range, the extract liquid and the sulfuric acid aqueous solution can be well brought into contact with each other, it is possible to reduce the amount of dissolution, into sulfuric acid, of a double salt of rare-earth elements and sulfuric acid (hereinafter referred to as "rare-earth element-sulfuric acid double salt" or "solid sulfate") obtained by the contact, and hence the above-mentioned range is preferred. When the concentration of sulfuric acid decreases, the solubility of a double salt increases, the back extraction property thereof decreases, and hence the liquid ratio needs to be decreased, with the result that a large apparatus needs to be placed, thus increasing the cost thereof. When the concentration of sulfuric acid increases, the specific gravity and viscosity of a sulfuric acid aqueous solution increase, and hence the sulfuric acid aqueous solution is difficult to handle. When the back extraction treatment is performed, rare-earth elements in the extract liquid come in contact with a sulfuric acid aqueous solution having a saturated concentration and are thus precipitated as a rare-earth element-sulfuric acid double salt, and hence it is preferred that the rare-earth elements be able to be recovered as a solid through precipitation separation. Further, the back extraction time is preferably 5 minutes or less, more preferably from 0.5 to 3 minutes. This is because back extraction treatment for a short back extraction time enables the reduction of the back extraction amount of Al, back extraction treatment for 0.5 minute or more enables achievement of a satisfactory back extraction ratio of rare-earth elements, and hence the separation ratio of Al and rare-earth elements can be increased.

Note that an extract liquid (organic phase) containing a large amount of Al obtained after rare-earth elements have been recovered by performing the extraction treatment is subjected to back extraction treatment by being brought into contact, for 50 minutes or more, with an acid such as a 40 to 60 mass % sulfuric acid aqueous solution or a 4 N to 8 N hydrochloric acid aqueous solution used as the back extractant, thereby being able to separate and remove Al extracted into the organic phase as aluminum sulfate or aluminum chloride. The organic phase from which the Al fraction has been separated and removed can be reused as a recycled extraction treatment liquid.

In the present invention, it is preferred that the back extraction step include dispersing a back extraction treatment liquid phase by bringing an extract liquid containing rare-earth elements (organic phase) and a back extraction treatment liquid (aqueous phase) into contact with each other, to thereby form a phase separation structure with a sea-island structure having an extract liquid phase (organic phase) and the back extraction treatment liquid phase (aqueous phase), the dispersing being performed so that the formed back extraction treatment liquid phase (droplet) having a substantially spherical shape has an average diameter (average droplet diameter) of from 0.2 to 1.0 mm, preferably from 0.2 to 0.8 mm. As described above, a liquid in which the extract liquid and the back extraction treatment liquid are brought into contact with each other is strongly stirred until the back extraction treatment liquid phase has a very small droplet diameter, thereby being able to bring the extract liquid and the back extraction treatment liquid into contact with each other efficiently. As a result, rare-earth elements can be recovered efficiently into the back extraction treatment liquid phase. The droplet diameter can be measured by using a known method. For example, a static image is obtained by, for example, camera photographing with strobe light and the static image can be used to measure the droplet diameter.

In the present invention, when the extract liquid containing rare-earth elements and the back extraction treatment liquid are brought into contact with each other to disperse the back extraction treatment liquid phase in the back extraction step, it is preferred that the liquid in which the extract liquid and the back extraction treatment liquid are brought into contact with each other be compulsively stirred by using, for example, a compulsive stirrer such as a rotating stirring blade, thereby introducing air from the central portion and producing air bubbles in the liquid by a shearing force of the stirring blade. In addition, it is also preferred that a gas such as air be introduced into the lower portion of a stirring blade, thereby remarkably producing air bubbles. When air bubbles are produced in the liquid as describe above, a shearing force is added to the liquid by the air bubbles, and a rising flow caused by the air bubbles and a descending flow caused by the back extraction treatment liquid phase (droplet) having a large specific gravity probably enable efficient stirring and dispersion of the back extraction treatment liquid phase. In order to increase the back extraction efficiency by the stirring, it is recommended to set the condition of the stirring appropriately so that the air bubbles produced in the liquid have an average diameter of from 0.2 to 0.6 mm. For example, there is given a method of controlling the circumferential speed of a rotating stirring blade to from 75 to 400 m/min.

Figure 1:
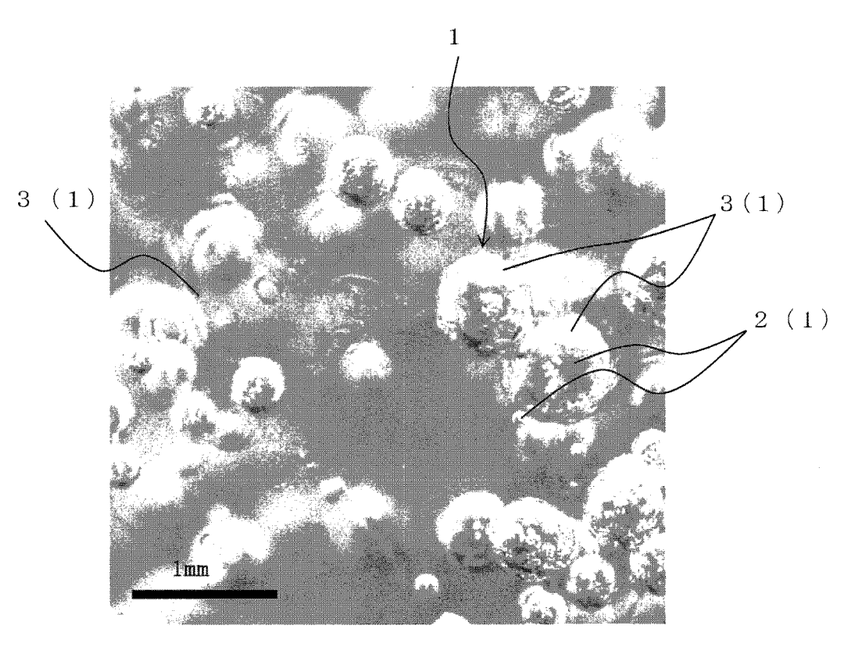
FIG. 1 is an explanatory diagram for illustrating composite particles produced when an extract liquid and a back extraction treatment liquid were stirred while being brought into contact with each other in a back extraction step of the present invention.

Then, the inventors of the present invention carefully observed the back extraction treatment liquid phase formed through the contact and dispersion of the extract liquid and the back extraction treatment liquid. When air bubbles were produced by stirring the liquid thereof by such a method as described above, the inventors confirmed the phenomenon that the back extraction treatment liquid phase attached to the surface of each of the air bubbles, forming one integrated particle (hereinafter referred to as "composite particle") (FIG. 1). That is, in this case, it was confirmed that the droplet formed by the back extraction treatment liquid phase was, more specifically, a composite particle integrally formed by an air bubble and a droplet of the back extraction treatment liquid phase. The inventors of the invention of the present application assume that the back extraction treatment liquid phase attaches to the surface of each of air bubbles, and hence the back extraction treatment liquid phase having a larger specific gravity has a specific gravity similar to that of the extract liquid phase, thereby being able to disperse well the air bubbles (that is, composite particles formed by attachment of the back extraction treatment liquid phase). It is particularly preferred that the condition of the stirring be appropriately set so that the phenomenon that the back extraction treatment liquid phase attaches to the surface of each of air bubbles, forming the composite particles, is caused as described above. In this case, the average diameter of the composite particles is preferably from 0.2 to 0.6 mm.

Then, it is preferred that the back extraction treatment be performed by using such a method as described above, because rare-earth elements can be recovered from the extract liquid at a high back extraction ratio, and, in particular, light rare-earth elements can be recovered at a back extraction ratio of nearly 100%.

Then, it is suitable to separate and purify rare-earth elements, which are Y and lanthanoids, from a crude recovered product recovered in the back extraction step into each element by a countercurrent multistage solvent extraction method, which is a known solvent extraction method.

EXAMPLES

The method of recovering rare-earth elements of the present invention, which involves using a bauxite residue as a raw material, is hereinafter specifically described by way of Examples and Comparative Examples, but the present invention is not limited to Examples and Comparative Examples.

Example 1

(Preparation of Raw Material Bauxite Residue)

Bauxite was pulverized by using a ball mill. After that, a Bayer process was carried out under the conditions of a treatment temperature of 135° C. and an addition amount of CaO of 3.0%, and a bauxite residue was recovered in the Bayer process. The recovered bauxite residue had a specific surface area of 51.5 m²/g. A direct display specific surface analyzer (trade name: MONOSORB; manufactured by Quantachrome Instruments, Inc. (FL, USA)) was used to measure the specific surface area. Further, inductively coupled plasma atomic emission spectrophotometry (ICP-AES) was used to measure the content (ppm) of the rare-earth elements contained in the recovered bauxite residue, and the result was 3,000 ppm in total.

[Leaching Step]

Next, water was added to the bauxite residue at 500 parts by mass with respect to 100 parts by mass of the bauxite residue, preparing a slurry. The slurry was filtered with a 100-mesh vibrating wet filter, preparing a slurry having a concentration of 190 g/L and a liquid-solid ratio (L/S) of 5.26 for leaching treatment. Then, the slurry for leaching treatment and a 6 N sulfuric acid aqueous solution were added into a first reaction tank equipped with a stirring blade from the above thereof under the conditions of normal pressure and a temperature of 25° C. while the flow rates were controlled so as to form droplets, and the mixture was stirred, causing a leaching reaction. After 30 minutes of retention, the slurry was taken out from the bottom of the reaction tank and sent into a second reaction tank equipped with a stirring blade, followed by stirring. In addition, while the pH of the slurry was continually measured with a pH measuring apparatus provided in the second reaction tank, the ratio of the flow rates of the slurry for leaching treatment and the 6 N sulfuric acid aqueous solution was controlled so that the slurry in the second reaction tank had a pH of 1.0. After 30 minutes of retention, the slurry was taken out from the bottom of the second reaction tank and sent into a third reaction tank equipped with a stirring blade. The same operation as that in the second reaction tank was also performed in the third reaction tank and the next fourth reaction tank. Then, the slurry taken out from the bottom of the fourth reaction tank after the completion of the leaching treatment was filtered with a 100-mesh vibrating wet filter, and the resultant bauxite residue slurry was sent into a pH-controlled reaction tank equipped with a stirring blade together with a raw material bauxite residue at a ratio of 14% in terms of the weight of the resultant bauxite residue slurry. After 30 minutes of retention, the slurry taken out from the bottom of the pH-controlled reaction tank was sent into a filtration preparation tank, and solid-liquid separation was carried out by using a filter press filtration machine to recover a leachate at a ratio of 93%. The recovered leachate was stored in a leachate storing tank, the pH thereof was measured, and the result was 1.4. Further, the recovered leachate was used to carry out ICP-AES. The content (ppm) of each of rare-earth elements and impurities (Al, Si, Fe, Ca, Mn, Ti, and Th) was measured, and the leaching ratio of each element from the bauxite residue was determined. Table 1 shows the results.

TABLE 1

| Element name | Content (ppm) | Leaching ratio (mass %) |
|---|---|---|
| Al | 2,154 | 13.5 |
| Si | 1,063 | 61.1 |
| Fe | 57.0 | 0.1 |
| Ca | 971 | 14.0 |
| Mn | 53.0 | 7.0 |
| Ti | 11.3 | 0.2 |
| Sc | 0.6 | 3.6 |
| Y | 59.3 | 62.9 |
| La | 45.2 | 64.9 |
| Ce | 40.1 | 45.9 |
| Pr | 11.0 | 72.3 |
| Nd | 37.2 | 60.4 |
| Sm | 9.5 | 61.2 |
| Gd | 8.4 | 64.5 |
| Tb | 1.5 | 30.6 |
| Dy | 7.6 | 61.4 |
| Yb | 2.2 | 39.9 |
| Th | 1.1 | 27.1 |

[Pretreatment Step]

Next, pretreatment of the leachate was performed. That is, the resultant leachate was transferred into a mixer used for performing pretreatment, kerosene containing PC88A (manufactured by Daihachi Chemical Industry Co., Ltd.) at 0.02 mol/L and being used as a pretreatment liquid was then added, and the leachate and the pretreatment liquid were brought into contact with each other at a liquid ratio of 1:1, followed by stirring in the mixer for 5 minutes. After that, the mixture of the leachate and the pretreatment liquid was passed through a 1-μm filter, was transferred into a settler, was allowed to stand still for 15 minutes, and was separated into an organic phase and an aqueous phase. The aqueous phase was transferred as a pretreated leachate to the subsequent extraction step. Note that, because scum occurred at the upper portion of the organic phase, the organic phase was subjected to filtration treatment with a filter to remove the scum and the resultant organic phase was transferred into a pretreatment back extraction tank. After that, 12 N caustic soda was added as a back extraction treatment liquid into the organic phase after the filtration treatment, and the caustic soda and the organic phase were brought into contact with each other for 5 minutes at a liquid ratio of 1:10, followed by stirring. After that, the mixture was allowed to stand still for 15 minutes and was separated into an organic phase after back extraction in the pretreatment step and an aqueous phase (caustic soda). The aqueous phase (caustic soda) was filtered with a bag filter, and reddish brown mud accumulated on the bag filter. When the mud was analyzed by using inductively-coupled plasma optical emission spectrometry (ICP-OES) and inductively-coupled plasma mass spectrometry (ICP-MS), a Sc component, a Ti component, and a small amount of each of Zr, Th, U, Al, and Fe were detected. The extraction ratio of each of Sc and Ti from the leachate was 100%. The organic phase after the back extraction in the pretreatment step was reused as a pretreatment liquid without further treatment or after being mixed with a 6 N sulfuric acid aqueous solution.

[Extraction Step]

Next, the pH of the pretreated leachate recovered in the pretreatment step was measured, and the pH was adjusted to 1.2. The pretreated leachate after the pH adjustment was transferred into an extraction tank. Kerosene containing D2EHPA (manufactured by Daihachi Chemical Industry Co., Ltd.) at 0.8 mol/L and being used as an extraction treatment liquid was added into the extraction tank, and the pretreated leachate and the extraction treatment liquid were brought into contact with each other at a liquid ratio of 3:1, followed by stirring for 3 minutes. After that, the mixture was allowed to stand still for 15 minutes and was separated into an organic phase and an aqueous phase. The organic phase was recovered as an extract liquid in which rare-earth elements had been extracted and was transferred into a back extraction tank used for performing the subsequent back extraction step. Note that the aqueous phase after the extraction treatment was subjected to neutralization treatment with caustic lime and was discarded into a pond.

The amount of each of rare-earth elements and impurities recovered in the extract liquid was measured by using ICP-OES and the extraction ratios thereof from the pretreated leachate were determined. Table 2 shows the results.

[Back Extraction Step]

A method of recovering rare-earth elements from the extract liquid recovered in the above-mentioned extraction step was carried out as follows. That is, the extract liquid transferred into the back extraction tank from the extraction step and a 50% sulfuric acid aqueous solution used as a back extraction treatment liquid were brought into contact with each other at a liquid ratio of 10:1, and the mixed liquid was stirred in a mixer tank equipped with a rotating stirring blade for a retention time of 3 minutes. In this case, the spindle of the stirring blade was structured to have a hole so that air was introduced from the center of the stirring blade into the mixed liquid, producing air bubbles and the air bubbles were evenly circulated in the tank, and the rotating speed of the stirring blade was adjusted to 2,000 rpm so that the stirring blade had a circumferential speed of 350 m/min. When the average diameter of the air bubbles in the mixed liquid was determined, the result was 0.3 mm. As shown in FIG. 1, each droplet of the back extraction treatment liquid phase (3) formed of sulfuric acid was attached to the surface of each of the air bubbles (2), forming composite particles (1) (FIG. 1). Note that the average diameter of the composite particles was measured by using a static image obtained by emitting strobe light from the above of the tank and photographing the composite particles with a camera through an observation window.

After that, the mixed liquid of the extract liquid and the back extraction treatment liquid was transferred into a settling tank and was allowed to stand still for 20 minutes, separating it into an organic phase and an aqueous phase. The aqueous phase was recovered and was transferred into a filter tank. A precipitate in the aqueous phase was separated and was subjected to measurement by ICP-OES. As a result, it was found that the precipitate included a solid sulfate of rare-earth elements at a ratio of about 50 mass % and calcium sulfate at a ratio of about 50 mass %. The recovery ratio of each of the rare-earth elements and impurity metals from the extract liquid was determined as a back extraction ratio. Table 3 shows the results. The back extraction ratio of each of the rare-earth elements was nearly 100%.

The aqueous phase obtained after separating the precipitate was transferred into a storing tank to be reused as a back extraction treatment liquid. Note that the organic phase after the above-mentioned back extraction treatment was transferred into a washing tank. In the washing tank, the organic phase and a 50% sulfuric acid aqueous solution (back extractant) were mixed with each other for 120 minutes in total at a liquid ratio of 10:1. After that, the mixed solution was allowed to stand still for 15 minutes, separating it into an organic phase (washed organic phase) and an aqueous phase (washed aqueous phase). The washed organic phase in which an Al fraction and the like had been removed was separated to be reused as an extraction treatment liquid (recycled extraction treatment liquid).

Examples 2 to 5 and Comparative Examples 1 to 3

Rare-earth elements were recovered through the same procedure as that in the method of Example 1 except that the pH of the pretreated leachate recovered via the leaching step and pretreatment step was changed to a value within the range of from 0.9 to 2.0. The extraction ratio of each of rare-earth elements and impurities recovered from the pretreated leachate in the extraction step was measured. Table 2 shows the results.

Comparative Example 4

Rare-earth elements were recovered via the extraction step and back extraction step in the method of Example 1 except that the pH of the leachate obtained in the leaching step was initially adjusted to 3.0, thereby causing production of a precipitate, followed by removal thereof, the pH thereof was then adjusted to 1.5, and the subsequent pretreatment step was not performed. The extraction ratio of each of rare-earth elements and impurities in the extraction step was measured. Table 2 shows the results.

TABLE 2

|  |  | Example | | | | | Comparative Example | | | |
| --- | --- | --- | --- | --- | --- | --- | --- | --- | --- | --- |
|  |  | 1 | 2 | 3 | 4 | 5 | 1 | 2 | 3 | 4 |
| pH of pretreated leachate | | 1.2 | 1.0 | 1.1 | 1.6 | 1.7 | 0.9 | 1.8 | 2.0 | 1.5 |
| Extraction ratio (mass %) | Al | 6 | 1 | 2 | 10 | 12 | 0 | 22 | 63 | 8 |
| | Fe | 31 | 19 | 25 | 41 | 44 | 12 | 52 | 91 | 35 |
| | Ti | 100 | 100 | 100 | 100 | 100 | 100 | 100 | 100 | 98 |
| | Si | 0 | 0 | 0 | 0 | 0 | 0 | 0 | 0 | 0 |
| | Ca | 15 | 7 | 10 | 38 | 50 | 0 | 52 | 57 | 36 |
| | Y | 100 | 100 | 100 | 100 | 100 | 100 | 100 | 100 | 90 |
| | La | 47 | 13 | 26 | 71 | 87 | 0 | 87 | 93 | 65 |
| | Ce | 66 | 42 | 56 | 89 | 91 | 0 | 94 | 96 | 85 |
| | Pr | 85 | 56 | 70 | 92 | 94 | 9 | 95 | 98 | 92 |
| | Nd | 90 | 63 | 75 | 94 | 96 | 10 | 98 | 99 | 93 |
| | Sm | 99 | 94 | 95 | 100 | 100 | 48 | 99 | 100 | 92 |
| | Gd | 100 | 98 | 99 | 100 | 100 | 80 | 100 | 100 | 91 |
| | Tb | 100 | 100 | 100 | 100 | 100 | 100 | 100 | 100 | 90 |

TABLE 2-continued

|  | Example | | | | | Comparative Example | | | |
|---|---|---|---|---|---|---|---|---|---|
|  | 1 | 2 | 3 | 4 | 5 | 1 | 2 | 3 | 4 |
| Dy | 100 | 100 | 100 | 100 | 100 | 100 | 100 | 100 | 90 |
| Yb | 100 | 100 | 100 | 100 | 100 | 100 | 100 | 100 | 27 |

According to the results of the extraction ratio of each element in Examples 1 to 5 and Comparative Examples 1 to 3 shown in Table 2, it is found that, when the pH of the leachate exceeds 1.7, the extraction ratio of Al sharply increases. Further, it is found that, particularly when the pH of the leachate is from 1.2 to 1.7, the extraction ratio of each of light rare-earth elements such as La can be increased to a higher level while the extraction ratio of Al is being suppressed. In contrast, it is found that, when the pH of the leachate is less than 1.0, the extraction ratio of Al is low, but the extraction ratio of each of the light rare-earth elements and medium rare-earth elements is low and, in particular, the extraction ratio of each of the light rare-earth elements is remarkably low. On the other hand, it was confirmed that, when the pH of the leachate was initially adjusted to 3.0 as in conventional methods, even if the pH of the leachate was adjusted to 1.5 afterward, the pH adjustment caused reduction of the extraction ratio of each of the rare-earth elements.

TABLE 3

| Condition |  |  |
|---|---|---|
|  | Extract liquid | 0.8 mol/L D2EHPA |
|  | Back extraction treatment liquid | 50% H$_2$SO$_4$ |
|  | Liquid ratio o:w (*1) | 10:1 |
|  | Mixing time | 3 min. |
|  | Number of stages | 1 |
| Back extraction ratio (mass %) | Al | 10 |
|  | Fe | 0 |
|  | Ti | 0 |
|  | Si | — (*2) |
|  | Ca | 97 |
|  | Y | 94 |
|  | La | 100 |
|  | Ce | 100 |
|  | Pr | 98 |
|  | Nd | 100 |
|  | Sm | 100 |
|  | Gd | 100 |
|  | Tb | 100 |
|  | Dy | 100 |
|  | Yb | 45 |

(*1) represents o: extract liquid and w: back extraction treatment liquid.
(*2) Insufficient accuracy because of a measurement value at the lower limit Examples 6 to 8

[Adjustment of Oxidation-Reduction Potential of Leachate by Electrolytic Reduction]

In a method similar to that of Example 1, a pretreated leachate whose pH had been adjusted to 1.3 and a leachate obtained by additionally reducing the pretreated leachate by using an electrolytic reduction apparatus (manufactured by ourselves) so that the reduced leachate had an oxidation-reduction potential of +300 mV or less (with reference to Ag/AgCl electrode) were prepared. Actual measurement values of their oxidation-reduction potentials were measured with a digital voltmeter by using a platinum electrode and HS-205C (silver chloride electrode) (manufactured by DKK-TOA CORPORATION). The same procedure as that in Example 1 except the above-mentioned procedure was used to recover rare-earth elements (Example 6 and Example 7). The extraction ratio of each of rare-earth elements and impurities recovered from the pretreated leachate in the extraction step was measured. Table 4 shows the results.

[Adjustment of Oxidation-Reduction Potential of Leachate by Addition of Reducing Agent]

In a method similar to that of Example 1, the pretreated leachate whose pH had been adjusted to 1.3 was reduced by adding metal iron (steel wool) as a reducing agent so that the reduced leachate had an oxidation-reduction potential of +300 mV or less (with reference to Ag/AgCl electrode). An actual measurement value of the oxidation-reduction potential after the reduction treatment was measured by the same method as that described above (Example 8). The same procedure as that in Example 1 except the above-mentioned procedure was used to recover rare-earth elements. The extraction ratio of each of rare-earth elements and impurities recovered from the pretreated leachate in the extraction step was measured. Table 4 shows the results.

TABLE 4

|  |  | Example | | |
|---|---|---|---|---|
|  |  | 6 | 7 | 8 |
| Oxidation-reduction potential (mV) of pretreated leachate (with reference to Ag/AgCl electrode potential) | | 400 to 490 | 0 to 100 | 20 to 250 |
| pH of leachate after adjustment of oxidation-reduction potential | | 1.3 | 1.3 | 1.3 |
| Method of adjusting oxidation-reduction potential | | No adjustment | Electrolytic reduction | Addition of reducing agent (metal iron) |
| Extraction ratio (mass %) | Al | 7 | 6 | 7 |
|  | Fe | 33 | 1 | 5 |
|  | Ti | 100 | 99 | 99 |
|  | Si | 0 | 0 | 0 |
|  | Ca | 23 | 22 | 21 |
|  | Y | 99 | 100 | 99 |
|  | La | 67 | 65 | 66 |
|  | Ce | 87 | 84 | 86 |
|  | Pr | 92 | 91 | 91 |
|  | Nd | 94 | 94 | 94 |
|  | Sm | 98 | 98 | 97 |
|  | Gd | 100 | 100 | 100 |
|  | Tb | 100 | 99 | 99 |
|  | Dy | 100 | 100 | 100 |
|  | Yb | 99 | 100 | 99 |

According to the results of Table 4, it is found that the extraction ratio of Fe can be remarkably reduced in Examples 7 and 8, in which the oxidation-reduction potential of each leachate is from 0 to 250 mV, as compared to Example 6, in which the adjustment of the oxidation-reduction potential of the leachate was not performed.

Examples 9 to 11

Rare-earth elements were recovered through the same procedure as that in Example 1 except that, in the extraction step in Example 1, the pH of the pretreated leachate was adjusted to 1.3, the oxidation-reduction potential of the pretreated leachate was adjusted to 470 mV by bubbling with air, and the conditions of the extraction step were changed to the conditions shown in Table 5. The extraction ratio of each of rare-earth elements and impurities recovered from the pretreated leachate in the extraction step was measured. Table 5 shows the results. It is found that rare-earth elements can be efficiently extracted while the extraction ratio of Al is controlled by adjusting the liquid ratio and the number of stages while changing the concentration condition of the extraction treatment liquid.

TABLE 5

| | | Example | | |
|---|---|---|---|---|
| | | 9 | 10 | 11 |
| Extraction treatment liquid | | | D2EHPA | |
| Concentration of extraction treatment liquid (mol/L) | | 0.3 | 0.8 | 1.2 |
| pH of pretreated leachate | | 1.3 | 1.3 | 1.3 |
| Liquid ratio (o:w) (*3) | | 1:1 | 1:3 | 1:1 |
| Mixing time (minutes) | | 3 | 3 | 3 |
| Number of stages | | 3 | 3 | 1 |
| Extraction ratio (mass %) | Al | 4 | 2 | 10 |
| | Fe | 45 | 36 | 35 |
| | Ti | 100 | 100 | 100 |
| | Si | 0 | 6 | 0 |
| | Ca | 21 | 28 | 27 |
| | Y | 100 | 99 | 100 |
| | La | 61 | 92 | 88 |
| | Ce | 78 | 96 | 94 |

TABLE 5-continued

| | Example | | |
|---|---|---|---|
| | 9 | 10 | 11 |
| Pr | 92 | 97 | 98 |
| Nd | 98 | 98 | 100 |
| Sm | 99 | 100 | 99 |
| Gd | 100 | 100 | 100 |
| Tb | 99 | 100 | 100 |
| Dy | 100 | 100 | 100 |
| Yb | 100 | 100 | 100 |

(*3) represents o: extraction treatment liquid and w: pretreated leachate.

Examples 12 and 13

In the back extraction step in Example 1, the pH of the pretreated leachate was adjusted to 1.5, and the condition of the extraction step (first treatment: 0.3 mol/L, second treatment: 1.2 mol/L) and the conditions of the back extraction step were set to the following conditions shown in Table 6. A 6 N hydrochloric acid aqueous solution was used as the back extraction treatment liquid. The same method as that of Example 1 except the above was used to recover an aqueous phase (hydrochloric acid aqueous solution) and recovery rare-earth elements. Table 6 shows the results. A hydrochloric acid aqueous solution having a good back extraction characteristic was used and two kinds of extraction treatment liquids having different concentrations were used, one kind thereof being suitable for extracting light and medium rare-earth elements and the other kind thereof being suitable for extracting heavy rare-earth elements, thus being able to provide a good extraction ratio and a good back extraction ratio. As a result, in both the extraction step and the back extraction step, rare-earth elements were concentrated by from 25 to 100 times, but the Al fraction was not concentrated, and hence the rare-earth elements were able to be efficiently recovered as a hydrochloric acid aqueous solution.

TABLE 6

| | | Example | | | |
|---|---|---|---|---|---|
| | | 12 | | 13 | |
| pH of pretreated leachate | | 1.5 | | 1.5 | |
| Extraction step | Extraction treatment liquid | | D2EHPA | | |
| | Number of extraction treatment | First treatment | Second treatment | First treatment | Second treatment |
| | Concentration (mol/L) of extraction treatment liquid | 0.3 | 1.2 | 0.3 | 1.0 |
| | Liquid ratio (o:w) (*4) | 1:10 | 1:10 | 1:5 | 1:5 |
| Back extraction step | Mixing time (minutes) | 2 | 2 | 2 | 2 |
| | Number of stages | 3 | 3 | 3 | 3 |
| | Back extraction treatment liquid | | 6N HCl | | |
| | Liquid ratio (o:w) (*5) | 10:1 | 10:1 | 5:1 | 5:1 |
| Concentration ratio (*6) | Al | | 3 | | 3 |
| | Pr—Yb average | | 99 | | 25 |

(*4) represents o: extraction treatment liquid and w: pretreated leachate.
(*5) represents o: extract liquid and w: back extraction treatment liquid.
(*6) represents concentration of rare-earth elements in back extract liquid/concentration of rare-earth elements in leachate.

What is claimed is:

1. A method of recovering rare-earth elements from a bauxite residue, which is produced as a by-product in a Bayer process and is used as a raw material, the method comprising:
   a leaching step of bringing the bauxite residue into contact with a liquid leaching agent to recover a leachate containing rare-earth elements;
   a pretreatment step of bringing the leachate recovered in the leaching step into contact with a pretreatment liquid containing one of a phosphoric acid ester-based extractant and a phosphonic acid ester-based extractant at a concentration of from 0.01 to 0.1 mol/L, followed by filtration treatment, to thereby recover a pretreated leachate containing the rare-earth elements;

an extraction step of bringing the pretreated leachate into contact with an extraction treatment liquid containing a phosphoric acid ester-based extractant to recover an extract liquid containing the rare-earth elements; and a back extraction step of bringing the extract liquid into contact with a back extraction treatment liquid to recover the rare-earth elements, the leaching step comprising recovering a leachate having a pH of 0.5 to 1.2 by using an acidic liquid leaching agent, the extraction step comprising adjusting the pH of the pretreated leachate to 1.0 to 1.7 and then bringing the pretreated leachate into contact with the extraction treatment liquid under a condition that the pretreated leachate has an oxidation-reduction potential of 300 mV or less adjusted by a method of performing electrolytic reduction treatment, wherein the back extraction treatment liquid comprises a 40 to 60 mass % sulfuric acid aqueous solution, and wherein the extract liquid and the sulfuric acid aqueous solution are brought into contact with each other at a volume ratio of extract liquid:sulfuric acid aqueous solution of from 5:1 to 10:1, or wherein the back extraction treatment liquid comprises a 4 N to 8 N hydrochloric acid aqueous solution, and wherein the extract liquid and the hydrochloric acid aqueous solution are brought into contact with each other at a volume ratio of extract liquid:hydrochloric acid aqueous solution of from 5:1 to 10:1.

2. A method of recovering rare-earth elements according to claim 1, wherein the extraction treatment liquid in the extraction step contains the phosphoric acid ester-based extractant at a concentration of from 0.2 to 1.5 mol/L.

3. A method of recovering rare-earth elements according to claim 1, wherein the back extraction step comprises: dispersing a back extraction treatment liquid phase by bringing the extract liquid and the back extraction treatment liquid into contact with each other, to thereby form a phase separation structure having an extract liquid phase and the back extraction treatment liquid phase dispersing in the extract liquid phase, the dispersing being performed so that the back extraction treatment liquid phase has an average droplet diameter of from 0.2 to 1.0 mm; and recovering the rare-earth elements.

4. A method of recovering rare-earth elements according to claim 1, wherein the back extraction treatment liquid comprises the 40 to 60 mass % sulfuric acid aqueous solution, and wherein the extract liquid and the sulfuric acid aqueous solution are brought into contact with each other at the volume ratio of the extract liquid:the sulfuric acid aqueous solution of from 5:1 to 10:1.

5. A method of recovering rare-earth elements according to claim 1, wherein the back extraction treatment liquid comprises the 4 N to 8 N hydrochloric acid aqueous solution, and wherein the extract liquid and the hydrochloric acid aqueous solution are brought into contact with each other at the volume ratio of the extract liquid:the hydrochloric acid aqueous solution of from 5:1 to 10:1.

6. A method of recovering rare-earth elements according to claim 1, further comprises: subjecting the extract liquid used in the back extraction step to back extraction in presence of an acid aqueous solution as a back extractant so as to reduce an accumulated Al fraction and obtain an recycled extraction treatment liquid; and reusing the recycled extraction treatment liquid in the extraction step.

7. A method of recovering rare-earth elements according to claim 1, wherein the leaching step is conducted without adjusting the pH of the leachate to 2.5 to 3.5.

* * * * *